US008312727B2

(12) United States Patent
Bishara et al.

(10) Patent No.: US 8,312,727 B2
(45) Date of Patent: *Nov. 20, 2012

(54) VIBRATION DAMPER

(75) Inventors: Fady Bishara, Cincinnati, OH (US); Jeffrey Lehtinen, Concord Township, OH (US)

(73) Assignee: Parker-Hannifin Corporation, Cleveland, OH (US)

(*) Notice: Subject to any disclaimer, the term of this patent is extended or adjusted under 35 U.S.C. 154(b) by 1472 days.

This patent is subject to a terminal disclaimer.

(21) Appl. No.: 11/862,163

(22) Filed: Sep. 26, 2007

(65) Prior Publication Data

US 2008/0245901 A1 Oct. 9, 2008

Related U.S. Application Data

(60) Provisional application No. 60/826,934, filed on Sep. 26, 2006.

(51) Int. Cl.
*F02C 7/20* (2006.01)

(52) U.S. Cl. .............................. 60/800; 60/740; 267/205

(58) Field of Classification Search .................... 60/740, 60/800, 742, 746, 747, 734; 267/196, 201, 267/202, 205, 209
See application file for complete search history.

(56) References Cited

U.S. PATENT DOCUMENTS

| | | | | |
|---|---|---|---|---|
| 3,690,413 | A | 9/1972 | Airheart | |
| 4,043,506 | A | 8/1977 | Guido et al. | |
| 4,161,509 | A | 7/1979 | Nowak | |
| 5,273,249 | A | 12/1993 | Peterson et al. | |
| 5,369,952 | A | 12/1994 | Walters | |
| 5,394,688 | A | 3/1995 | Amos | |
| 5,435,884 | A | 7/1995 | Simmons et al. | |
| 5,465,907 | A | 11/1995 | Hofmann | |
| 6,038,862 | A | 3/2000 | Melman et al. | |
| 6,098,407 | A | 8/2000 | Korzendorfer et al. | |
| 6,151,898 | A | 11/2000 | Hogan | |
| 6,321,541 | B1 | 11/2001 | Wrubel et al. | |
| 6,711,898 | B2 | 3/2004 | Laing et al. | |
| 6,718,770 | B2 | 4/2004 | Laing et al. | |
| 6,880,341 | B2 | 4/2005 | Parkman et al. | |
| 6,886,346 | B2 | 5/2005 | Sobieski et al. | |
| 2005/0247496 | A1 * | 11/2005 | Nagaya | 180/65.5 |

* cited by examiner

*Primary Examiner* — Ehud Gartenberg
*Assistant Examiner* — Andrew Nguyen
(74) *Attorney, Agent, or Firm* — Renner, Otto, Boisselle & Sklar, LLP

(57) ABSTRACT

Fuel injector assemblies with frictionally damped fuel supply members, including fuel feed strips. More particularly, the invention provides friction dampers and/or assemblies that frictionally damp movement of fuel supply members in at least one direction as a function of frequency. Accordingly, low frequency vibration can be undamped, while vibration above a prescribed frequency can be damped. Some of the embodiments provide a friction damper that is easily serviceable, and can be installed after final assembly of a fuel injector. Aspects of the invention are applicable to other components of fuel injectors and gas turbine engines in addition to fuel supply members.

11 Claims, 7 Drawing Sheets

VIBRATION DAMPER

RELATED APPLICATION

This application claims the benefit of U.S. Provisional Application No. 60/826,934 filed Sep. 26, 2006, which is hereby incorporated herein by reference.

FIELD OF THE INVENTION

The present invention relates generally to fuel injectors. More particularly, the invention relates to fuel injectors for use with gas turbine combustion engines.

BACKGROUND OF THE INVENTION

A gas turbine engine contains a compressor in fluid communication with a combustion system that often contains a plurality of combustors. The compressor raises the pressure of the air passing through each stage of the compressor and directs it to the combustors where fuel is injected and mixed with the compressed air. The fuel and air mixture ignites and combusts creating a flow of hot gases that are then directed into the turbine. The hot gases drive the turbine, which in turn drives the compressor, and for electrical generation purposes, can also drive a generator.

Most combustion systems utilize a plurality of fuel injectors for staging, emissions purposes, and flame stability. Fuel injectors for applications such as gas turbine combustion engines direct pressurized fuel from a manifold to the one or more combustion chambers. Fuel injectors also function to prepare the fuel for mixing with air prior to combustion. Each fuel injector typically has an inlet fitting connected either directly or via tubing to the manifold, a tubular extension or stem connected at one end to the fitting, and one or more spray nozzles connected to the other end of the stem for directing the fuel into the combustion chamber. A fuel passage (e.g., a tube or cylindrical passage) extends through the stem to supply the fuel from the inlet fitting to the nozzle. Appropriate valves and/or flow dividers can be provided to direct and control the flow of fuel through the nozzle and/or fuel passage.

The fuel passage, also referred to as fuel supply member, a fuel feed strip or macrolaminate strip, is typically supported at each end thereof in a cavity within the stem. In a typical fuel injector, the stem is exposed to the high temperatures of the combustor and undergoes thermal expansion in response to the higher temperatures. The fuel feed strip, being cooled by the fuel flowing internally thereto, generally undergoes thermal expansion to a lesser degree than the stem. This difference in thermal expansion can result in undesirable stresses being placed on the fuel feed strip and/or stem. Accordingly, fuel feed strips typically have some axial flexibility to mitigate such stresses.

An example of a fuel feed strip supported at each end within a chamber of a stem is disclosed in U.S. Pat. No. 6,711,898 to Laing et al. The single fuel feed strip (fuel passage) contained in the hollow stem of the injector has a convoluted shape that provides some axial flexibility to allow axial expansion and contraction of the fuel feed strip in response to thermal expansion and/or contraction of the stem and/or fuel feed strip itself.

Of particular concern in the design of any component of a gas turbine engine, and in particular the fuel feed strip, is both high and low cycle fatigue. Low cycle fatigue generally occurs due to thermal expansion and contraction of engine components during operation, as just described. High cycle fatigue generally occurs when resonance or vibration modes are excited by driving frequencies inherent in the operation of the engine. For example, shaft rotation imbalance can produce driving frequencies between about 200 to about 300 Hertz (Hz). Driving frequencies due to combustion rumble can be in the range of about 300 Hz to about 800 Hz. Fuel pump pulsations can produce driving frequencies in the range of 1200 Hz. Blade passing frequencies can be upwards of 1200 Hz.

Prior art fuel injectors have incorporated devices and designs, such as that shown in U.S. Pat. No. 6,038,862, to address the issue of high cycle fatigue. Typically, such devices are intended to damp vibration of the parts to avoid resonance. However, such devices can be complex and require additional parts which can resonate themselves. Further, many such devices must be installed prior to assembly of the fuel injector and are not easily serviced. Some designs can restrict movement of the fuel feed strip in response to thermal expansion of the stem and/or strip and thereby induce undesirable stresses in the assembly.

Another approach has been to alter the natural frequency, also referred to herein as resonant frequency, of the parts. In general, reinforcing ribs and/or additional structure is provided to increase the natural frequency of the part above the anticipated driving frequencies of the turbine. While effective in many applications, the additional structure can be bulky and also tends to increase the stiffness of the parts which can be undesirable in applications where flexibility of the part is desired or necessary. Further, in the event a resonant driving frequency occurs, such approach does not provide damping to dissipate energy from the assembly.

Still another approach has been to alter the natural frequency of the part by shaping the part such that its natural frequency is above the maximum driving frequency the part will experience. For example, U.S. Pat. No. 6,098,407 discloses a fuel injector including a fuel supply tube that is coiled into a 360 degree spiral shape. Ideally, the curvature of the tube is such that the tube's natural frequency is well above the maximum vibratory frequency that the tube will experience during engine operation. Again, while effective for many applications, such approach does not provide damping to dissipate energy from the assembly and thus if a resonant driving frequency occurs, the fuel feed strip can be damaged.

SUMMARY OF THE INVENTION

The present invention provides fuel injector assemblies with frictionally damped fuel supply members, including fuel feed strips. More particularly, the invention provides friction dampers and/or assemblies that frictionally damp movement of fuel supply members in at least one direction as a function of frequency. Accordingly, the invention provides a friction damper that allows low frequency vibration (movement), such as due to thermal expansion, while damping vibration above a prescribed frequency. Some of the embodiments provide a friction damper that is easily serviceable, and can be installed after final assembly of a fuel injector. Aspects of the invention are applicable to other components of fuel injectors and gas turbine engines in addition to fuel supply members.

In accordance with an aspect of the invention, a fuel injector assembly for a gas turbine engine comprises a fuel supply member for providing fuel to a nozzle of the fuel injector, and a damper operatively connected to the fuel supply member for damping movement of the fuel supply member. The damper is operable to apply a variable damping force to the fuel supply member as a function of the frequency of movement of the fuel supply member. More particularly, the damper can be configured to apply a relatively low damping force to the fuel supply member when the movement of the fuel supply member is at a relatively low frequency, and apply a relatively high damping force to the fuel supply member when the movement of the fuel supply member is at a relatively high frequency.

In one embodiment, the fuel supply member and damper are supported in a chamber of a housing of the injector, and the damper further comprises a plunger member configured to move in response to movement of the fuel supply member. The plunger member is engaged by a variable friction member configured to increasingly frictionally engage the plunger member in response to vibration of the fuel supply member above a prescribed frequency. The plunger can be supported for axial movement within a housing of the damper, and the variable friction member can include a friction shoe disposed between the plunger and the housing. The friction shoe can be movable radially relative to the plunger and fixed to the plunger for axial movement therewith. A wedge member, biased against the friction shoe, can be configured to permit axial movement of the friction shoe in response to movement of the plunger below a prescribed frequency and to urge the friction shoe radially outward against the housing in response to axial movement of the friction shoe in response to movement of the plunger above a prescribed frequency thereby increasingly restricting movement of the plunger. The wedge member can be a wedge ring supported coaxially with the plunger in the damper housing.

According to another embodiment, the fuel supply member and damper are supported in a chamber of a housing of the injector, and the damper further comprises a damper housing secured to the injector housing, the damper housing configured to receive a plunger member fixed for movement with the fuel supply member. At least one friction shoe supported by the housing and biased towards the fuel supply member can be provided, the friction shoe configured to frictionally engage a surface of the plunger member. The friction shoe can be configured to permit axial movement of the plunger member within the housing below a prescribed frequency and to increasingly frictionally engage the plunger member in response to axial movement of the plunger member within the housing above a prescribed frequency thereby increasingly restricting movement of the fuel supply member. A pair of friction shoes can be configured to engage opposing sides of the plunger member, each friction shoe supported for sliding movement within the damper housing against a ramp surface such that movement of the friction shoes in at least one direction increases the pressure applied to the plunger member by the friction shoes.

The fuel injector assembly can comprise a pressure plate biased towards the fuel supply member and at least partially defining a chamber having a fixed width within the damper housing, and first and second non-circular rotatable elements supported within the chamber. The plunger member extends between and is frictionally engaged with the non-circular rotatable elements such that the combined dimension of the non-circular rotatable elements and the plunger member correspond to the fixed width of the chamber such that axial movement of the plunger member below a prescribed frequency is relatively unrestricted, while axial movement of the plunger member above a prescribed frequency tends to rotate the non-circular rotatable members such that the combined dimension of the non-circular rotatable elements and the plunger member tends to increase thereby forcing the non-circular rotatable elements against the damper housing and the plunger member and thereby increasingly restricting movement of the fuel supply member. The non-circular rotatable elements can be elliptical pins.

In accordance with another embodiment, the damper comprises a damper housing secured to the fuel supply member, the housing having a chamber therein, and a ball movable within the chamber, wherein movement of the ball within the chamber in response to movement of the fuel supply member damps movement of the fuel supply member. The damper can be removable as a unit from the fuel injector assembly, and the plunger member can be a fin secured to the fuel supply member for movement therewith.

In accordance with another aspect, a damper for a fuel supply member of a fuel injector for a gas turbine engine comprises a plunger member configured to move in response to movement of the fuel supply member, the plunger member engaged by a variable friction member configured to increasingly frictionally engage the plunger member in response to vibration of the fuel supply member above a prescribed frequency.

Further features of the invention will become apparent from the following detailed description when considered in conjunction with the drawings.

DETAILED DESCRIPTION

Figure 1:
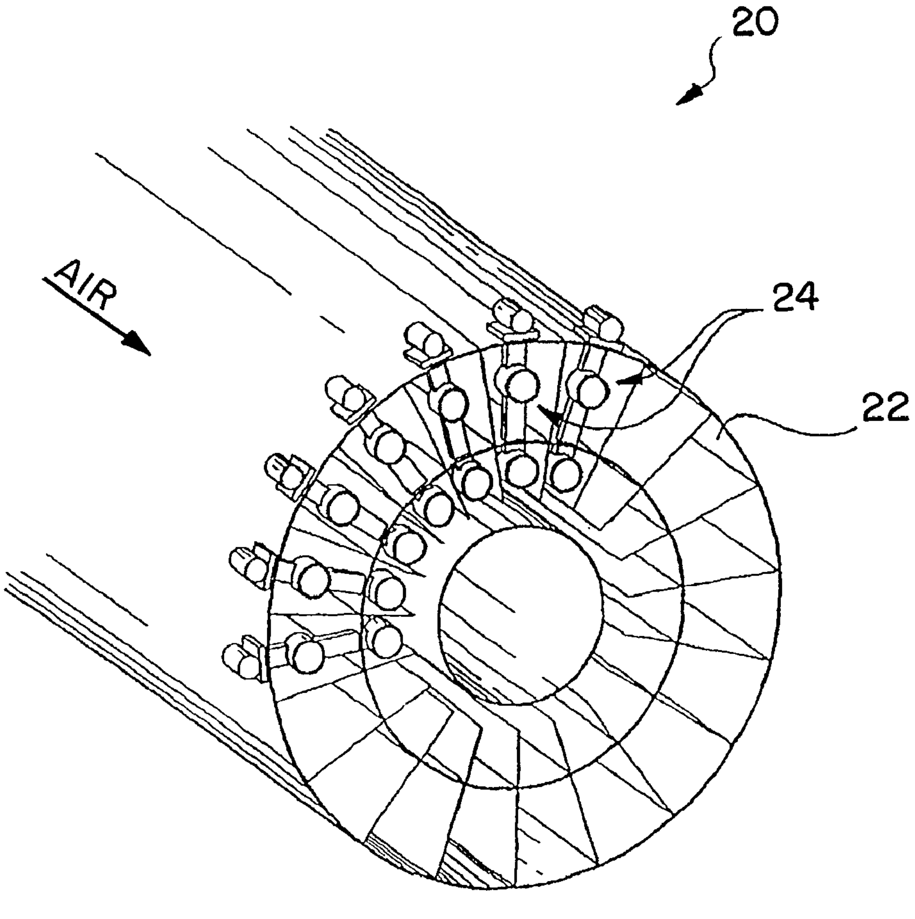
FIG. 1 is a perspective view of the inlet into a dual concentric combustion chamber for a gas turbine engine including a fuel injector assembly according to the prior art.

Referring to the drawings and initially to FIG. 1, a portion of a known combustion engine is indicated generally at 20. The upstream, front wall of a dual combustion chamber for the engine is shown at 22, and a plurality of fuel injectors, for example as indicated generally at 24, are shown supported within the combustion chamber. The fuel injectors 24 atomize and direct fuel into the combustion chamber 22 for burning. Combustion chamber 22 can be any useful type of combustion chamber, such as a combustion chamber for a gas turbine combustion engine of an aircraft, however, the present invention is believed useful for combustion chambers for any type of combustion application, such as in land vehicles. In any case, the combustion chamber will not be described herein for sake of brevity, with the exception that as should be known to those skilled in the art, air at elevated temperatures (up to 1300.degree. F. in the combustion chamber of an aircraft), is directed into the combustion chamber to allow combustion of the fuel.

As illustrated in FIG. 1, a dual nozzle arrangement for each injector is shown, where each of the fuel injectors 24 includes two nozzle assemblies for directing fuel into radially inner and outer zones of the combustion chamber. It should be noted that this multiple nozzle arrangement is only provided for exemplary purposes, and the present invention is useful with a single nozzle assembly, as well as injectors having more than two nozzle assemblies in a concentric or series configuration. It should also be noted that while a number of such injectors are shown in an evenly-spaced annular arrangement, the number and location of such injectors can vary, depending upon the particular application. One of the advantages of the present invention it is that is useful with a variety of different injector configurations.

Figure 2:
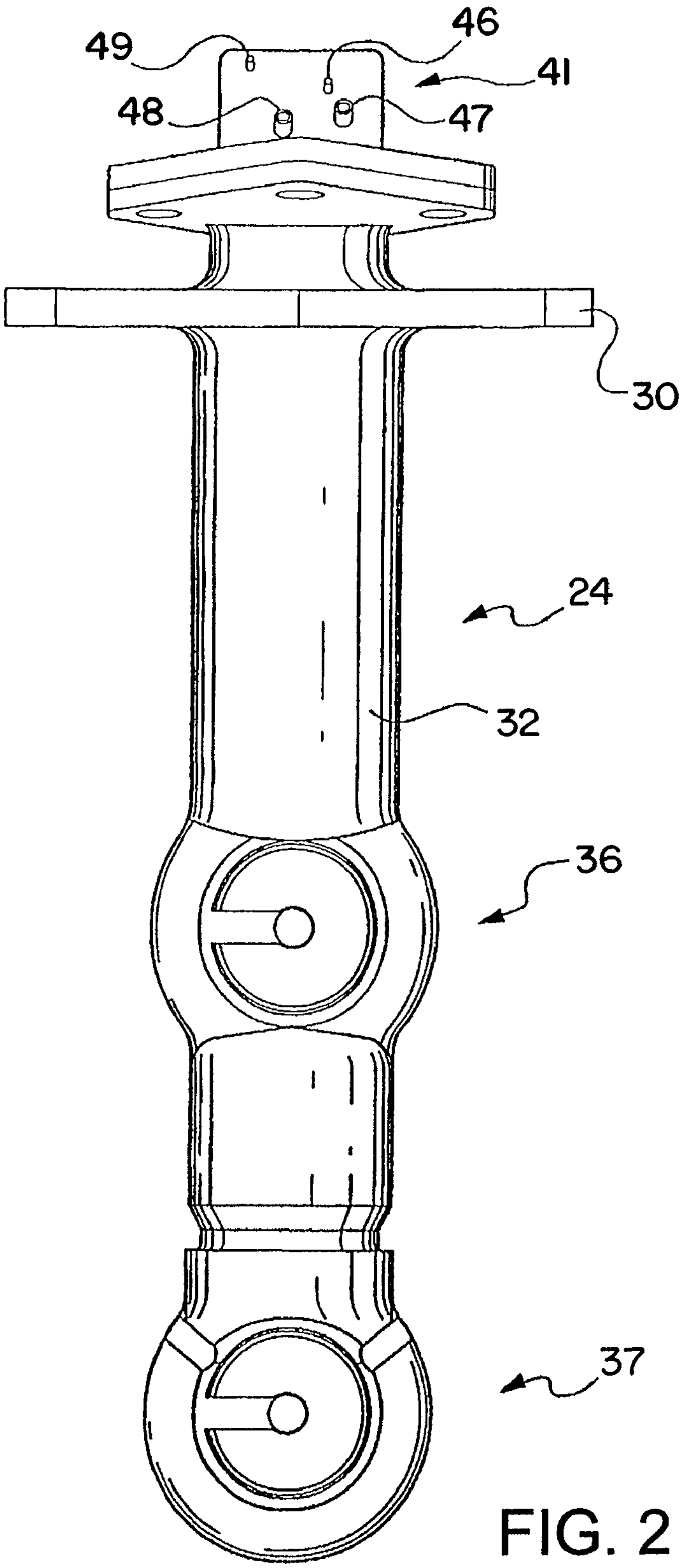
FIG. 2 is a perspective view of a fuel injector for the engine of FIG. 1.
Figure 3:
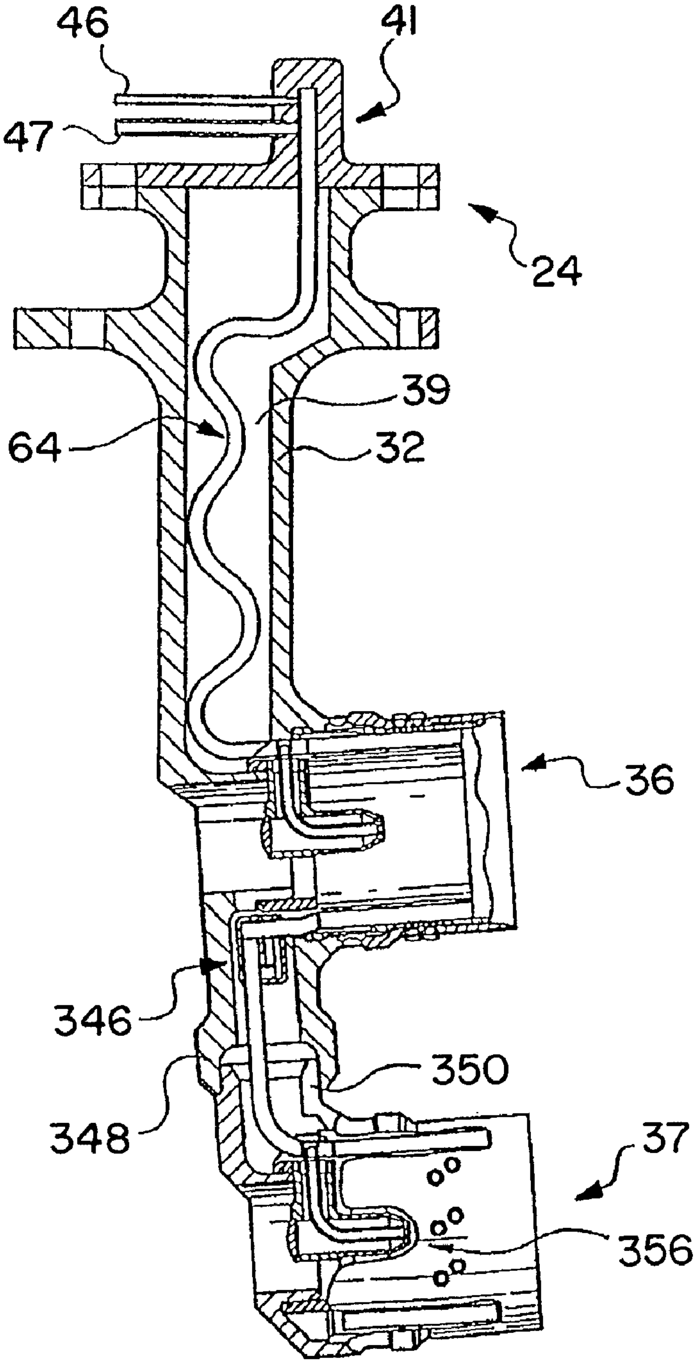
FIG. 3 is a cross-sectional view of the fuel injector of FIG. 2.

Referring now to FIGS. 2 and 3, each fuel injector 24, which are typically identical, includes a nozzle mount or flange 30 adapted to be fixed and sealed to the wall of the combustor casing (such as with appropriate fasteners); a housing stem 32 integral or fixed to flange 30 (such as by brazing or welding); and one or more nozzle assemblies such as at 36, 37, supported on stem 32. Stem 32 is generally cylindrical and includes an open inner chamber 39. The various components of the fuel injector 24 are preferably formed from material appropriate for the particular application as should be known to those skilled in the art.

An inlet assembly, indicated generally at 41, is disposed above or within the open upper end of chamber 39, and is integral with or fixed to flange 30 such as by brazing. Inlet assembly 41 is also formed from material appropriate for the particular application and includes inlet ports 46-49 which are designed to fluidly connect with a fuel manifold (not shown) to direct fuel into the injector 24.

Each of the nozzle assemblies 36, 37 is illustrated as including a pilot nozzle, indicated generally at 58, and a secondary nozzle, indicated generally at 59. Both nozzles 58, 59 are generally used during normal and extreme power situations, while only pilot nozzle 58 is generally used during start-up. Again, a pilot and secondary nozzle configuration is shown only for exemplary purposes, and it is within the scope of the present invention to provide only a single nozzle for each nozzle assembly 36, 37, or more than two nozzles for each nozzle assembly.

An elongated fuel feed strip, indicated generally at 64, provides fuel from inlet assembly 41 to nozzle assemblies 36, 37. Feed strip 64 is an expandable feed strip formed from a material which can be exposed to combustor temperatures in the combustion chamber without being adversely affected. To this end, feed strip 64 has a convoluted (or tortuous) shape and includes a plurality of laterally-extending, regular or irregular bends or waves as at 65, along the longitudinal length of the strip from inlet end 66 to outlet end 69 to allows for expansion and contraction of the feed strip in response to thermal changes in the combustion chamber while reducing mechanical stresses within the injector. Although the convolutions allow expansion of the feed strip 64, they also tend to reduce the natural frequency of the feed strip 64.

By the term "strip", it is meant that the feed strip has an elongated, essentially flat shape (in cross-section), where the side surfaces of the strip are essentially parallel, and oppositely facing from each other; and the essentially perpendicular edges of the strip are also essentially parallel and oppositely-facing. The strip 64 has essentially a rectangular shape in cross-section (as compared to the cylindrical shape of a typical fuel tube), although this shape could vary slightly depending upon manufacturing requirements and techniques. The strip 64 is shown as having its side surfaces substantially perpendicular to the direction of air flow through the combustion chamber. This may block some air flow through the combustor, and in appropriate applications, the strip 64 may be aligned in the direction of air flow.

Feed strip 64 includes a plurality of inlet ports, where each port fluidly connects with inlet ports 46-49 in inlet assembly 41 to direct fuel into the feed strip 64. The inlet ports 46-49 feed multiple fuel paths down the length of the strip 64 to pilot nozzles and secondary nozzles in both nozzle assemblies 36, 37, as well as provide cooling circuits for thermal control in both nozzle assemblies. For ease of manufacture and assembly, the feed strip 64 and secondary nozzle 59 can be integrally connected to each other, and can be formed unitarily with one another, to define a fuel feed strip and nozzle unit.

The fuel combustion chamber and prior art fuel injectors described in FIGS. 1-3 are further described in commonly-assigned U.S. Pat. No. 6,711,898, which is hereby incorporated by reference herein in its entirety. Although these fuel injectors are adequate for use in many applications, the convoluted fuel feed strip 64 can be subject to resonance in certain applications.

Figure 4:
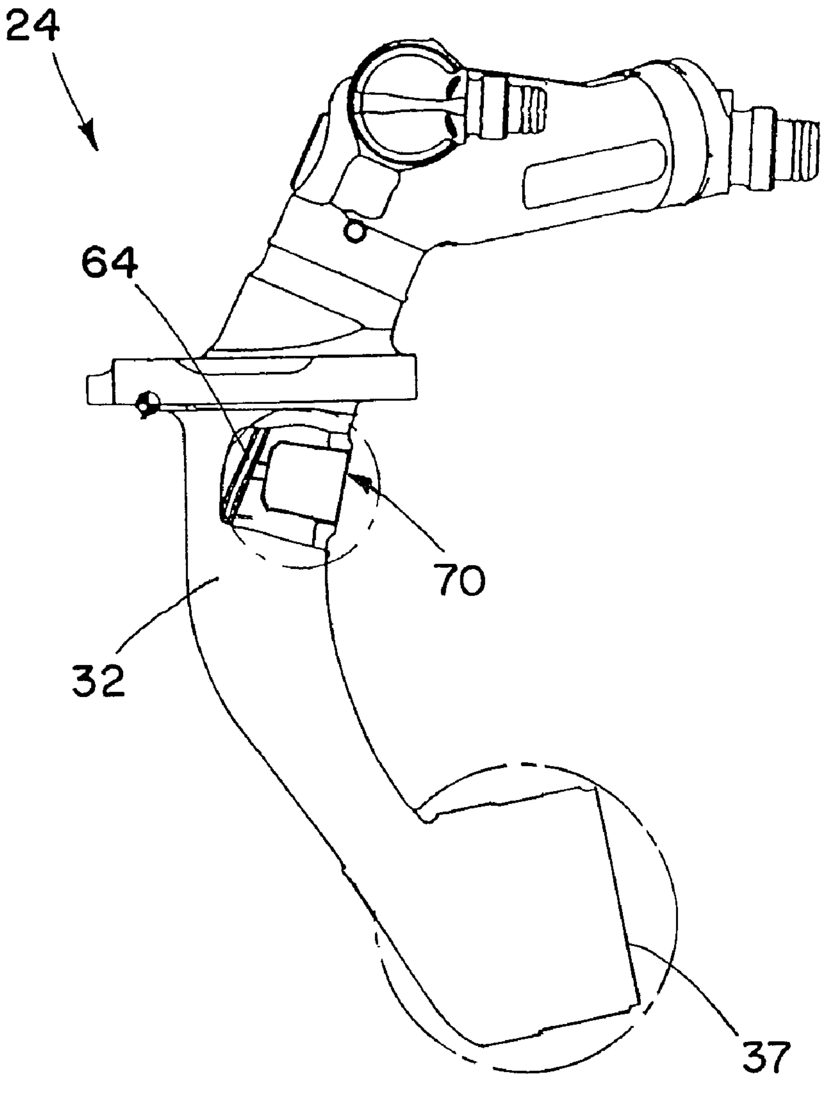
FIG. 4 is a side view of an exemplary fuel injector with a vibration damper assembly in accordance with the invention.

Turning now to FIG. 4, an injector 24 in accordance with an exemplary embodiment of the present invention will be described. The injector 24 is substantially similar to the injector described above (FIG. 3) except that the stem 32 and fuel feed strip 64 have a generally bowed shape, the injector has a single nozzle 37, and the injector 24 includes a variable force friction damper 70. It will be appreciated, however, that the variable force friction dampers described herein can be utilized in conjunction with injectors and fuel supply members of a variety of shapes, including the fuel feed strip of FIG. 3, for example.

Figure 5:
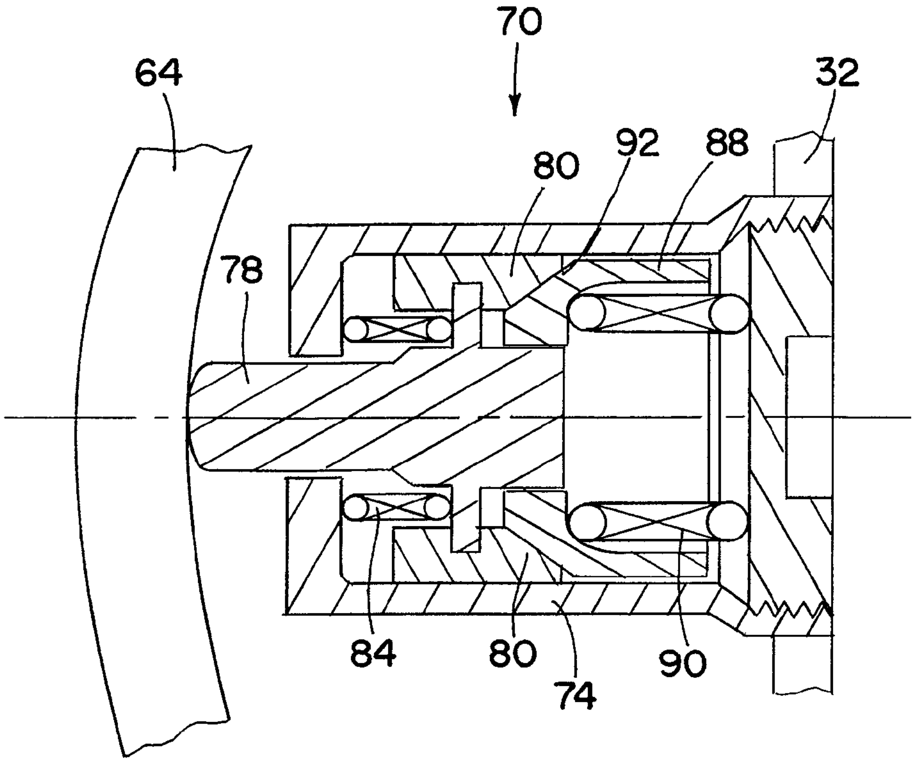
FIG. 5 is an enlarged portion of FIG. 4 illustrating the vibration damper in cross-section.

In FIG. 5, which is an enlarged portion of FIG. 4, the variable force friction damper 70 is illustrated. The variable force friction damper assembly 70 is supported by housing 32 of the fuel injector 24. The damper assembly 70 includes a housing 74 supporting a plunger 78 for axial movement therein. The plunger 78 is engaged with a surface of fuel supply member 64 such that movement of the fuel supply member 64 results in movement of the plunger 78. The plunger 78 is frictionally engaged with a surface of the housing 74 via a pair of friction shoes 80 fixed to a flange 81 of the plunger 78 for axial movement with the plunger 78. The friction shoes 80, however, are generally free to move radially outwardly as will be described in more detail below.

The plunger 78 is biased by a plunger spring 84 away from the fuel supply member 64. A wedge ring 88 is supported within the housing 74 and biased by wedge ring spring 90 towards the fuel supply member 64. The wedge ring 88 has a ramp surface 92 adapted to engage a corresponding surface of friction shoes 80. The ramp surface 92 operates to wedge the friction shoes 80 against the housing 74 under certain conditions as will now be described.

Under low frequency vibration, the fuel supply member 64 acts upon the plunger member 78 to axially displace the plunger member to the right and left in FIG. 5. Provided that the frequency of vibration of the fuel supply member 64 is below a prescribed frequency, the plunger 78 can shift axially to the right forcing friction shoes 80 against wedge ring 88 and compressing wedge spring 90. In this manner, the plunger 78 and wedge ring 88 shift axially to the right in FIG. 5 and little or no damping of such movement occurs.

When a sufficiently high frequency vibration occurs in the fuel supply member 64, rather than the wedge ring spring 90 compressing and allowing the plunger 78 to shift to the right, the friction shoes 80 impinge upon ramp surface 92 of wedge ring 88 which in turn forces the friction shoes 80 radially outward, thereby increasing friction between the friction shoes 80 and the housing 74 and, thus, increasingly frictionally damping movement of the fuel supply member 64.

It will be appreciated that this functionality is at least in part due to inertial and frictional effects that exist between the individual components of the vibration damper 70. For example, under sufficiently high frequency vibrations, the axial movement of the plunger 78 occurs at a rate that is sufficiently fast such that the friction shoes 80 experiences a radially expanding force as they are driven against the wedge ring 88, which is due to inertial effects and the bias of wedge ring spring 90.

Figure 6:
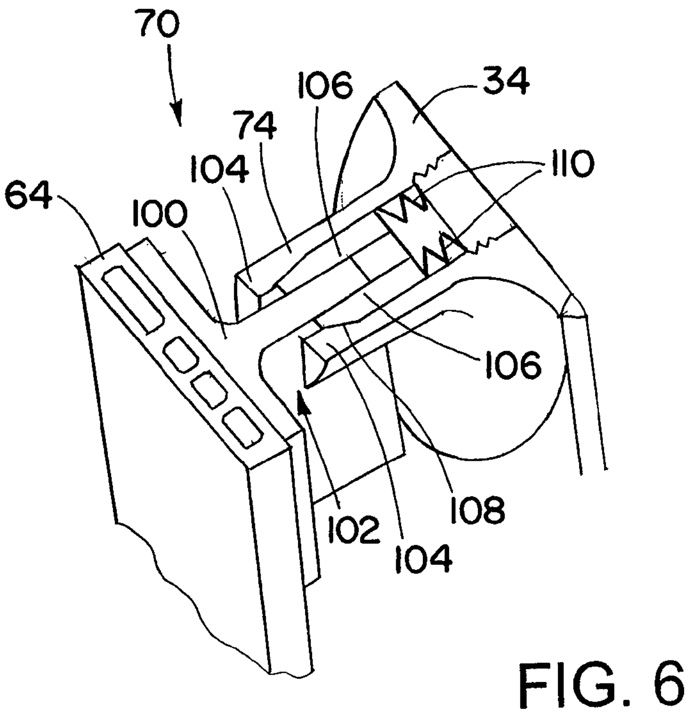
FIG. 6 is a perspective view of another exemplary vibration damper show n in partial cross-section in accordance with the invention.

Turning now to FIG. 6, another variable friction damper 70 is illustrated. In this embodiment, a fin structure 100 is secured, such as by brazing, to fuel supply member 64, which in this case is a fuel feed strip. The fin structure 100 is received within a slot 102 in a damper housing 74 mounted to the housing 32 of the fuel injector. The damper housing 74 includes a pair of opposed spaced-apart arms 104 forming the slot 102 therebetween.

The fin structure 100 is frictionally engaged with the arms 104 of the housing 74 via a pair of friction shoes 106. Each friction shoe 106 is biased towards the fuel supply member 64 against a ramp surface 108 by a friction shoe spring 110. Each ramp surface 110 is configured to urge a respective friction shoe 106 against a respective side of the fin structure 100, as will be described in more detail below.

During operation of the damper 70, low frequency vibrations are relatively undamped, as the fin structure 100 is generally free to move relative to the friction shoes 106. Vibration of a sufficiently high frequency, however, causes the fin structure 100 and friction shoes 106 to move together. As will be appreciated, movement of the friction shoes towards the fuel supply member 64 results in the friction shoes 106 applying an increasing pressure against the fin structure 100 as the friction shoes are forced against ramp surface 108. In this manner, the damper 70 applies a variable damping force to the fin structure 100 and, thus, the fuel supply member 64 as a function of frequency.

Figure 7:
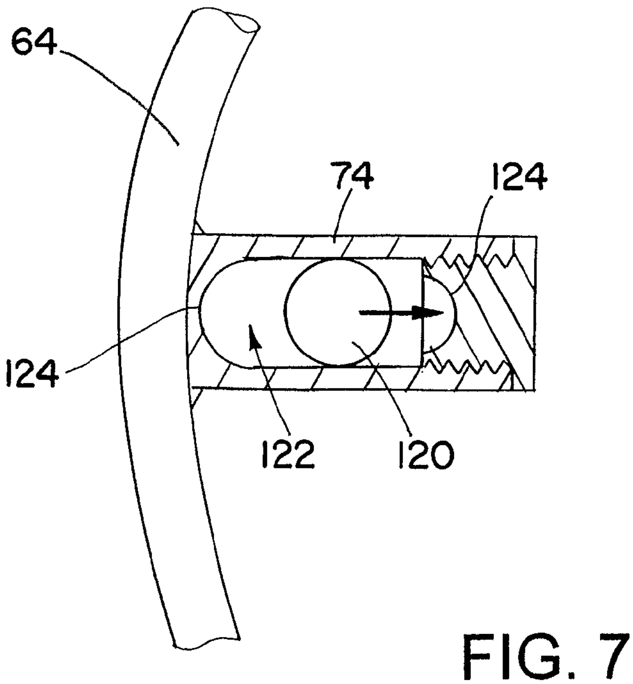
FIG. 7 is a perspective view of another exemplary vibration damper show n in partial cross-section in accordance with the invention.

Turning now to FIG. 7, yet another variable force friction damper 70 is illustrated. In this embodiment, the friction damper 70 includes a housing 74 mounted to the fuel supply member 64. A ball member 120 is supported within a chamber 122 of the housing 74. Movement of the fuel supply member 64 results in relative movement between the ball member 120 and the housing 74. As the ball member 120 hits spherical ends 124 of the chamber 122 it induces shock forces that can damp movement of the fuel supply member 64.

Figure 8:
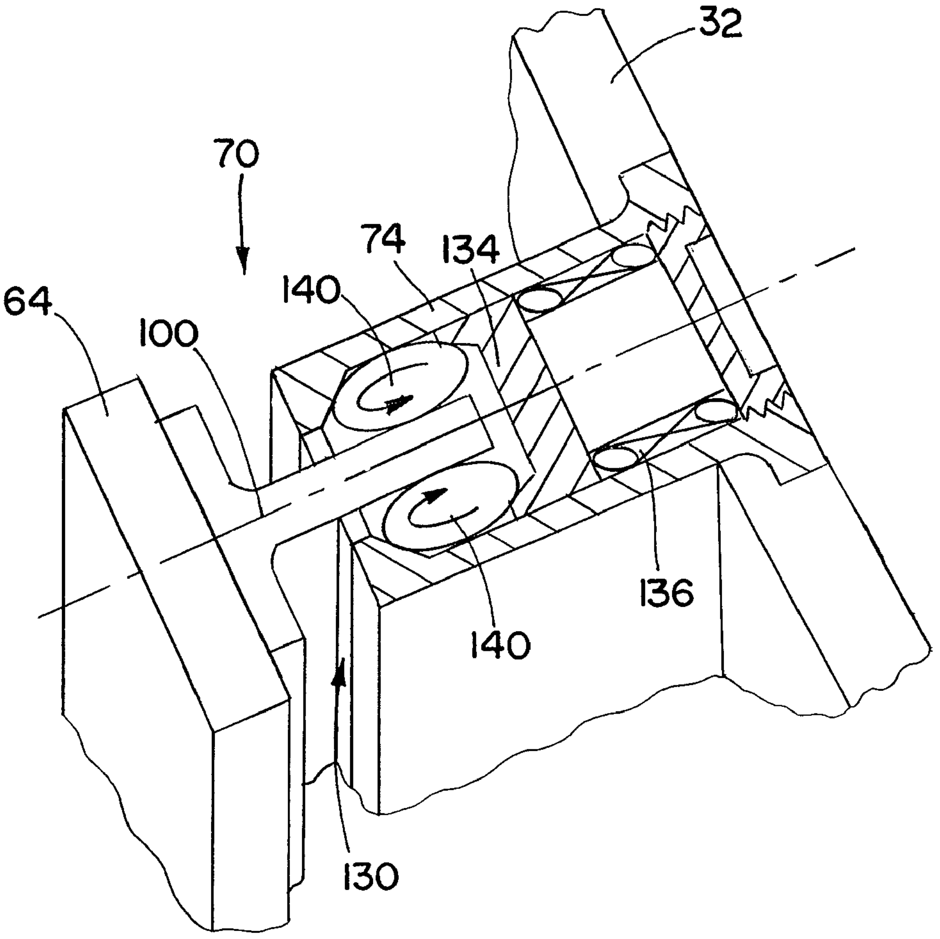
FIG. 8 is a perspective view of another exemplary vibration damper show n in partial cross-section in accordance with the invention.

Turning to FIG. 8, yet another variable force vibration damper is illustrated at 70. The damper 70 includes a damper housing 74 mounted to injector housing 32. The damper housing 74 has a slot 130 for receiving a fin structure 100 secured to fuel supply member 64. Within the housing 74, a pressure plate 134 is biased towards the fuel supply member 64 by a spring 136. First and second non-circular rotatable elements 140, which are elliptical pins in the illustrated embodiment, are supported within the housing 74 such that a plunger member (e.g., fin structure 100) secured to the fuel supply member 64 extends between and is frictionally engaged with the non-circular rotatable elements 140.

In the illustrated state of the damper 70, the combined dimension of the non-circular rotatable elements 140 and the plunger member 100 corresponds to the fixed width of the interior of the housing 74. That is to say, the combined width of the non-circular rotatable elements 140 and the plunger member 100 does not exceed the width of the housing 74 in the illustrated configuration. Accordingly, axial movement of the plunger member 100 below a prescribed frequency is relatively unrestricted, with the plunger member 100 moving independently of the non-circular rotatable elements 140. Axial movement of the plunger member 100 above a prescribed frequency tends to cause the non-circular rotatable members 140 move with the plunger member 100 such that the members 140 rotate thereby increasing the combined dimension of the non-circular rotatable elements 140 and the plunger member 100. As the non-circular rotatable elements 140 rotate they are forced against the damper housing 74 and, consequently, the plunger member 100 thereby increasingly restricting movement of the fuel supply member 64.

It will be appreciated that although the invention has been shown and described in the context of a fuel feed strip for a gas turbine engine, principles of the invention are applicable to other parts and components of gas turbine engines as well as other machinery where parts and components are subject to resonance and/or high-cycle fatigue.

It will be appreciated that the functionality of the at least some of the above-described devices is at least in part due to inertial and frictional effects that exist between the individual components of the dampers. Further, use of the term prescribed frequency corresponds to a frequency at which damping begins and/or increases. Of course, such frequency can be any suitable frequency depending on the application.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fuel injector assembly for a gas turbine engine comprising a fuel supply member for providing fuel to a nozzle of the fuel injector, and a damper operatively connected to the fuel supply member for damping movement of the fuel supply member, wherein the damper is operable to apply a variable damping force to the fuel supply member as a function of the frequency of movement of the fuel supply member, wherein the fuel supply member and damper are supported in a chamber of a housing of the injector, and wherein the damper further comprises a plunger member configured to move in response to movement of the fuel supply member, the plunger member engaged by a variable friction member configured to increasingly frictionally engage the plunger member in response to vibration of the fuel supply member above a prescribed frequency, wherein one end of the plunger member is engaged with a surface of the fuel supply member.

2. A fuel injector as set forth in claim 1, wherein the plunger is supported for axial movement within a housing of the damper, and wherein the variable friction member includes at least one friction shoe disposed between the plunger and the housing, the friction shoe being movable radially relative to the plunger and fixed to the plunger for axial movement therewith, and a wedge member biased against the friction shoe, the wedge member configured to permit axial movement of the friction shoe in response to movement of the plunger below a prescribed frequency and to urge the friction shoe radially outward against the housing in response to axial movement of the friction shoe in response to movement of the plunger above a prescribed frequency thereby increasingly restricting movement of the plunger.

3. A fuel injector assembly as set forth in claim 2, wherein the wedge member is a wedge ring supported coaxially with the plunger in the damper housing.

4. A fuel injector assembly as set forth in claim 1, wherein the damper is removable as a unit from the fuel injector assembly.

5. A fuel injector assembly as set forth in claim 1, wherein the plunger member is a fin secured to the fuel supply member for movement therewith.

6. A fuel injector assembly as set forth in claim 1, wherein the damper comprises a damper housing mountable as a unit to the housing of the injector, the damper housing being configured to receive and variably damp movement of the plunger member that moves in response to movement of the fuel supply member of the injector.

7. A fuel injector assembly for a gas turbine engine comprising a fuel supply member for providing fuel to a nozzle of the fuel injector, and a damper operatively connected to the fuel supply member for damping movement of the fuel supply member, wherein the damper is operable to apply a variable damping force to the fuel supply member as a function of the frequency of movement of the fuel supply member, wherein the fuel supply member and damper are supported in a chamber of a housing of the injector, and wherein the damper further comprises a damper housing secured to the injector housing, the damper housing configured to receive a plunger member fixed for movement with the fuel supply member, wherein one end of the plunger member is engaged with a surface of the fuel supply member.

8. A fuel injector assembly as set forth in claim 7, further comprising at least one friction shoe supported by the damper housing and biased towards the fuel supply member, the friction shoe configured to frictionally engage a surface of the plunger member, wherein the friction shoe is configured to permit axial movement of the plunger member within the damper housing below a prescribed frequency and to increasingly frictionally engage the plunger member in response to axial movement of the plunger member within the damper housing above a prescribed frequency thereby increasingly restricting movement of the fuel supply member.

9. A fuel injector assembly as set forth in claim 7, further comprising a pair of friction shoes configured to engage opposing sides of the plunger member, each friction shoe supported for sliding movement within the damper housing against a ramp surface such that movement of the friction shoes in at least one direction increases the pressure applied to the plunger member by the friction shoes.

10. A fuel injector assembly as set forth in claim 7, further comprising a pressure plate biased towards the fuel supply member and at least partially defining a damper chamber having a fixed width within the damper housing, and first and second non-circular rotatable elements supported within the damper chamber, wherein the plunger member extends between and is frictionally engaged with the non-circular rotatable elements such that the combined dimension of the non-circular rotatable elements and the plunger member correspond to the fixed width of the damper chamber such that axial movement of the plunger member below a prescribed frequency is relatively unrestricted, and wherein axial movement of the plunger member above a prescribed frequency tends to rotate the non-circular rotatable members such that the combined dimension of the non-circular rotatable elements and the plunger member tends to increase thereby forcing the non-circular rotatable elements against the damper housing and the plunger member and thereby increasingly restricting movement of the fuel supply member.

11. A fuel injector assembly as set forth in claim 10, wherein the non-circular rotatable elements are elliptical pins.

* * * * *